(12) United States Patent
Avendano Arenas et al.

(10) Patent No.: US 10,017,129 B2
(45) Date of Patent: Jul. 10, 2018

(54) ASSEMBLY COMPONENT INCORPORATING MULTI-STEP DOGHOUSE

(71) Applicant: FORD GLOBAL TECHNOLOGIES, LLC, Dearborn, MI (US)

(72) Inventors: Pamela Avendano Arenas, Mexico City (MX); Diego Fabricio Villacres Mesias, Mexico (MX)

(73) Assignee: Ford Global Technologies, LLC, Dearborn, MI (US)

( * ) Notice: Subject to any disclaimer, the term of this patent is extended or adjusted under 35 U.S.C. 154(b) by 517 days.

(21) Appl. No.: 14/709,538

(22) Filed: May 12, 2015

(65) Prior Publication Data

US 2016/0333909 A1    Nov. 17, 2016

(51) Int. Cl.
| | |
|---|---|
| *B60R 13/02* | (2006.01) |
| *F16B 5/12* | (2006.01) |
| *F16B 2/20* | (2006.01) |
| *F16B 3/00* | (2006.01) |

(52) U.S. Cl.
CPC ............ *B60R 13/0206* (2013.01); *F16B 2/20* (2013.01); *F16B 3/00* (2013.01); *F16B 5/12* (2013.01)

(58) Field of Classification Search
CPC . B60R 13/02; B60R 13/0206; B60R 13/0243; B60R 13/025; F16B 2/20; F16B 3/00; F16B 5/12

USPC ............................ 296/1.08, 146.7; 24/297
See application file for complete search history.

(56) References Cited

U.S. PATENT DOCUMENTS

| | | | |
|---|---|---|---|
| 6,594,870 | B1 | 7/2003 | Lambrecht et al. |
| 7,152,281 | B2 | 12/2006 | Scroggie |
| 7,178,855 | B2 | 2/2007 | Catron et al. |
| 7,698,787 | B2 | 4/2010 | Scroggie et al. |
| 7,954,205 | B2 | 6/2011 | Xueyong et al. |
| 9,670,947 | B2 * | 6/2017 | Bachelder ........... B60R 13/0206 |
| 2013/0221707 | A1 * | 8/2013 | Huttenlocher .......... B60R 19/52 296/193.1 |
| 2014/0191526 | A1 | 7/2014 | Lauxen et al. |

FOREIGN PATENT DOCUMENTS

DE    202012101049 U1    8/2013

OTHER PUBLICATIONS

English machine translation of DE202012101049.

* cited by examiner

*Primary Examiner* — Jason S Daniels
(74) *Attorney, Agent, or Firm* — Vichit Chea; King & Schickli, PLLC (57) ABSTRACT

An assembly component is provided that includes a body and a multi-step doghouse. The multi-step doghouse is carried on the body and includes a keyhole opening having multiple pin retaining positions.

16 Claims, 10 Drawing Sheets

ASSEMBLY COMPONENT INCORPORATING MULTI-STEP DOGHOUSE

TECHNICAL FIELD

This document relates generally to the field of fasteners and more particularly to an assembly component incorporating a multi-step doghouse that allows plastic push pins to have different constraint positions during part installation.

BACKGROUND

Assembly components often require multiple attachments to fix and properly maintain parts in certain, desired locations. This is particularly true of vehicle component parts such as trim parts for the cowl or other areas of the vehicle.

Sometimes, fixing points are facing multiple/different directions. This is especially true on curved parts. This condition provides a correct fit result with surrounding components but impairs the ease of part installation, resulting in high installation efforts, potential part deformation and unique manufacturing conditions. Once a fastener within the part is attached to its mating feature, the rest of the fixing points not in the same direction become harder to engage without excessive clearance on the counterpart.

While free play attachments or elimination of attachments in different directions improve installation conditions, such design elements often harm the resulting fit and finish between assembly components. This document relates to a new and improved assembly component incorporating a multi-step doghouse which functions to maintain a fastening pin in proper position in the component as the component is manipulated in order to complete the assembly process and actually guides the assembly process in a step-by-step manner.

SUMMARY

In accordance with the purposes and benefits described herein, an assembly component is provided. That assembly component comprises a body and a multi-step doghouse. The multi-step doghouse is carried on the body and includes a keyhole opening having multiple pin retaining positions. Those positions include at least one preliminary pin retaining position and a final pin retaining position.

In one possible embodiment, the keyhole opening further includes an entry, a first constriction between the entry and the preliminary pin retaining position and a second constriction between the preliminary pin retaining position and the final pin retaining position. In one possible embodiment, the entry, the preliminary pin retaining position and the final pin retaining position are all aligned and the keyhole opening is straight. In another possible embodiment, two of the entry, the preliminary pin retaining position and the final pin retaining position are aligned while the third is offset. In such an embodiment, the keyhole opening may be curved or angled.

In one possible embodiment, the keyhole opening includes a third constriction between the preliminary pin retaining position and the second constriction. In such an embodiment, the keyhole opening may further include a pin guide path between the second and third constrictions. Such a guide path holds the pin in the assembly component as the assembly component is manipulated as necessary to complete the assembly process. In one possible embodiment, the guide path is straight. In another possible embodiment, the guide path is curved. In yet another possible embodiment, the guide path includes at least one angle.

In yet another possible embodiment, the keyhole opening includes a second preliminary pin retaining position between the first preliminary pin retaining position and the final pin retaining position. In one possible embodiment, the second constriction is narrower than the first constriction.

In accordance with an additional aspect, a method is provided for assembling a first assembly component to a second assembly component. That method may be described as comprising the step of inserting a fastening pin into a preliminary pin retaining position in a keyhole opening of a multi-step doghouse carried on the first assembly component. Further, the method includes positioning the first assembly component relative to the second assembly component to bring the fastening pin into engagement with a pin receiving aperture in the second assembly component. Still further, the method includes the step of repositioning the first assembly component relative to the second assembly component to bring the first assembly component and the second assembly component into a final, assembled position. In such a position, the fastening pin is received and held in a final pin retaining position in the keyhole opening carried on the first assembly component and fully engaged in the pin receiving aperture in the second assembly component.

In one possible embodiment, the method further includes securing at least one other fastener between the first assembly component and the second assembly component prior to the repositioning step. In yet another possible embodiment, the method further includes moving the fastening pin through the keyhole opening between the preliminary pin retaining position and the final pin retaining position when repositioning the first assembly component relative to the second assembly component.

In one possible embodiment, the method includes moving the fastening pin along a straight path between the preliminary pin retaining position and the final pin retaining position. In another possible embodiment, the fastening pin is moved along a curved path. In yet another possible embodiment, the fastening pin is moved along an angled path.

In the following description, there are shown and described several preferred embodiments of the assembly component and related method. As it should be realized, the assembly component and method are capable of other, different embodiments and their several details are capable of modification in various, obvious aspects all without departing from the assembly component and method as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the assembly component and together with the description serve to explain certain principles thereof. In the drawing figures:

FIGS. 3a and 3b are detailed top plan views wherein FIG. 3a illustrates a fastening pin received in a preliminary pin retaining position and FIG. 3b illustrates that fastening pin received in a final pin retaining position of the multi-step doghouse illustrated in FIG. 2.

Reference will now be made in detail to the present preferred embodiments of the assembly component, examples of which are illustrated in the accompanying drawing figures.

DETAILED DESCRIPTION

Figure 1:
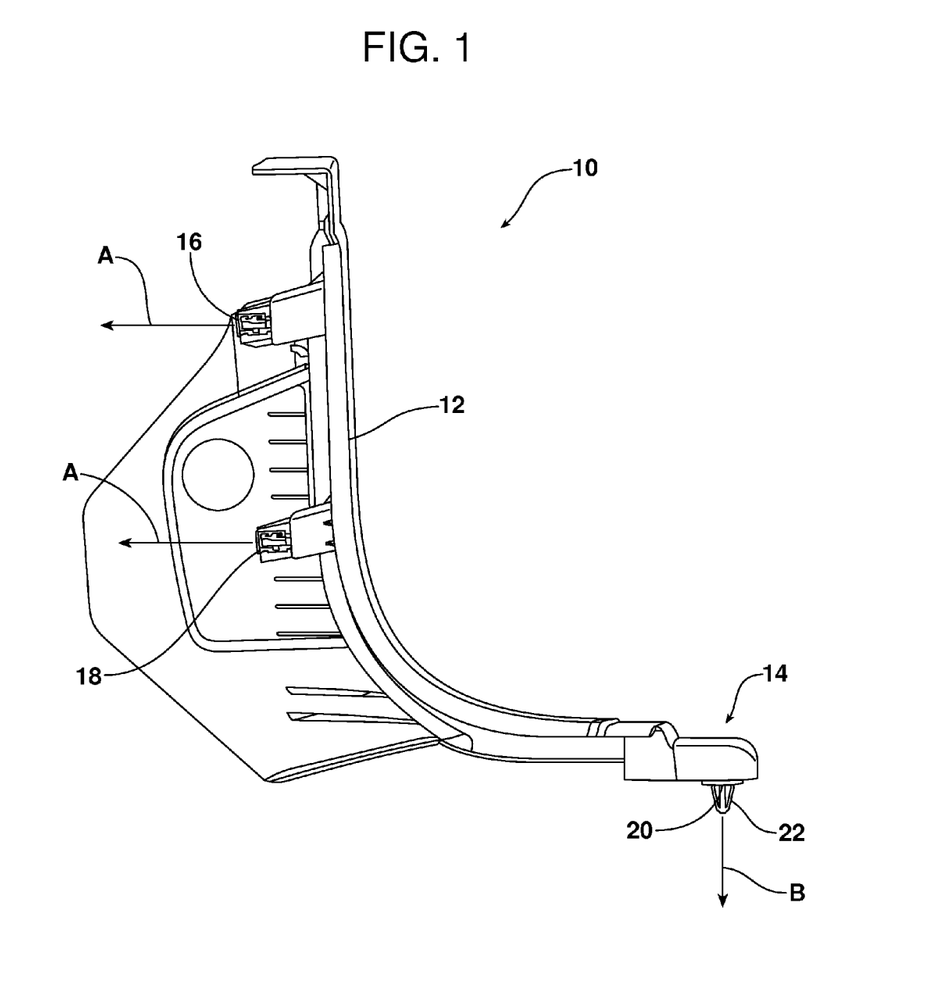
FIG. 1 is a side elevational view of an assembly component (i.e. cowl trim) including three fixing points (shown by action arrows) wherein two points extend to the left in the figure and a third point extends downwardly in the figure.

Reference is now made to FIG. 1 illustrating an assembly component 10 having a body 12 and a multi-step doghouse 14 carried on the body. In the illustrated embodiment, the assembly component 10 comprises a cowl trim that includes three fixing points 16, 18 and 20. As illustrated by the action arrows A, the first two fixing points 16, 18 face toward the left of the figure and require movement in the direction of the action arrows A in order to complete connection to a second assembly component (not shown in FIG. 1). In contrast, the third fixing point 20, which incorporates the multi-step doghouse 14 for receiving a fastening pin 22, requires movement in a second, downward direction in the drawing figure (note action arrow B) in order to complete connection to the second assembly component.

Figure 2:
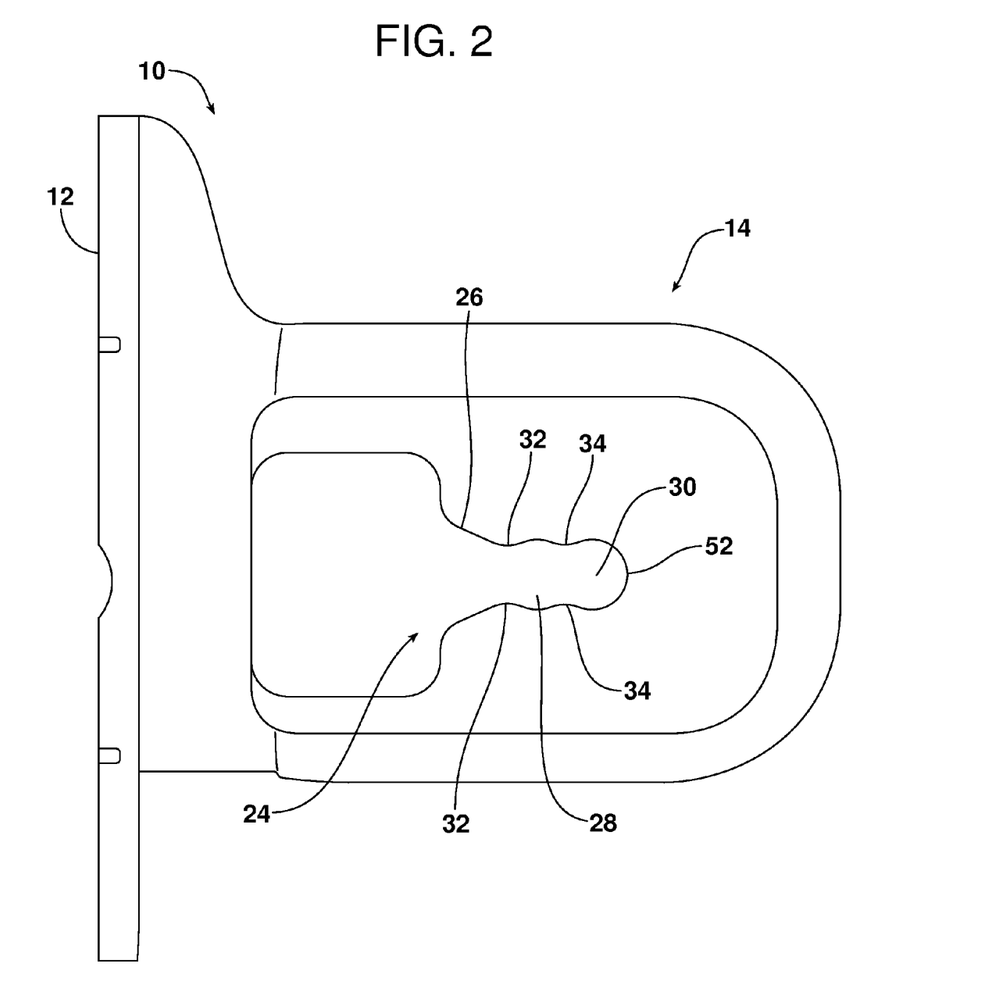
FIG. 2 is a detailed top plan view of a multi-step doghouse that is incorporated into the assembly component of FIG. 1.
Figure 3A:
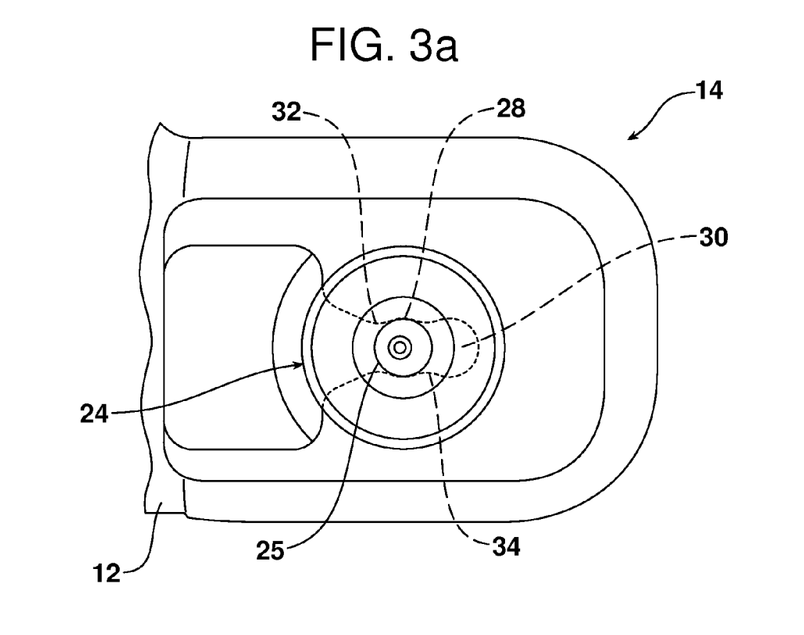
Figure 3B:
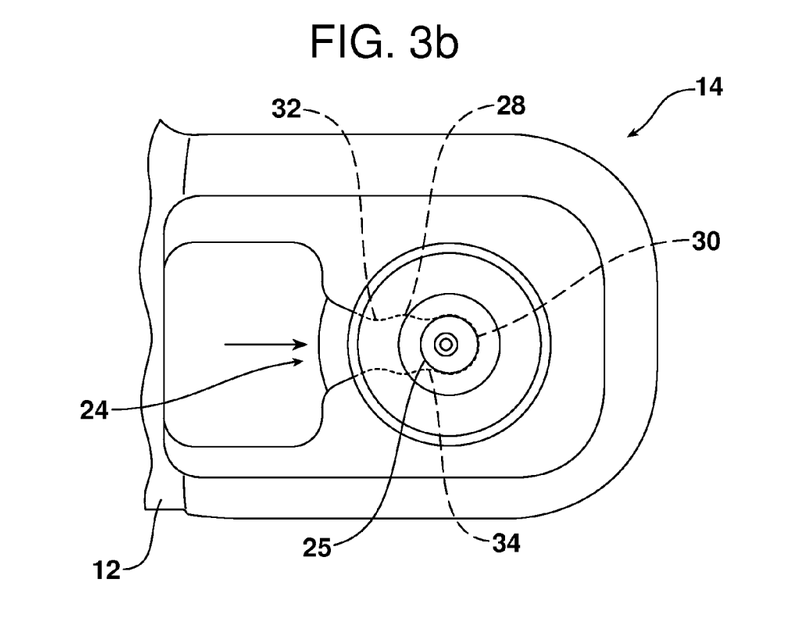
Figure 4A:
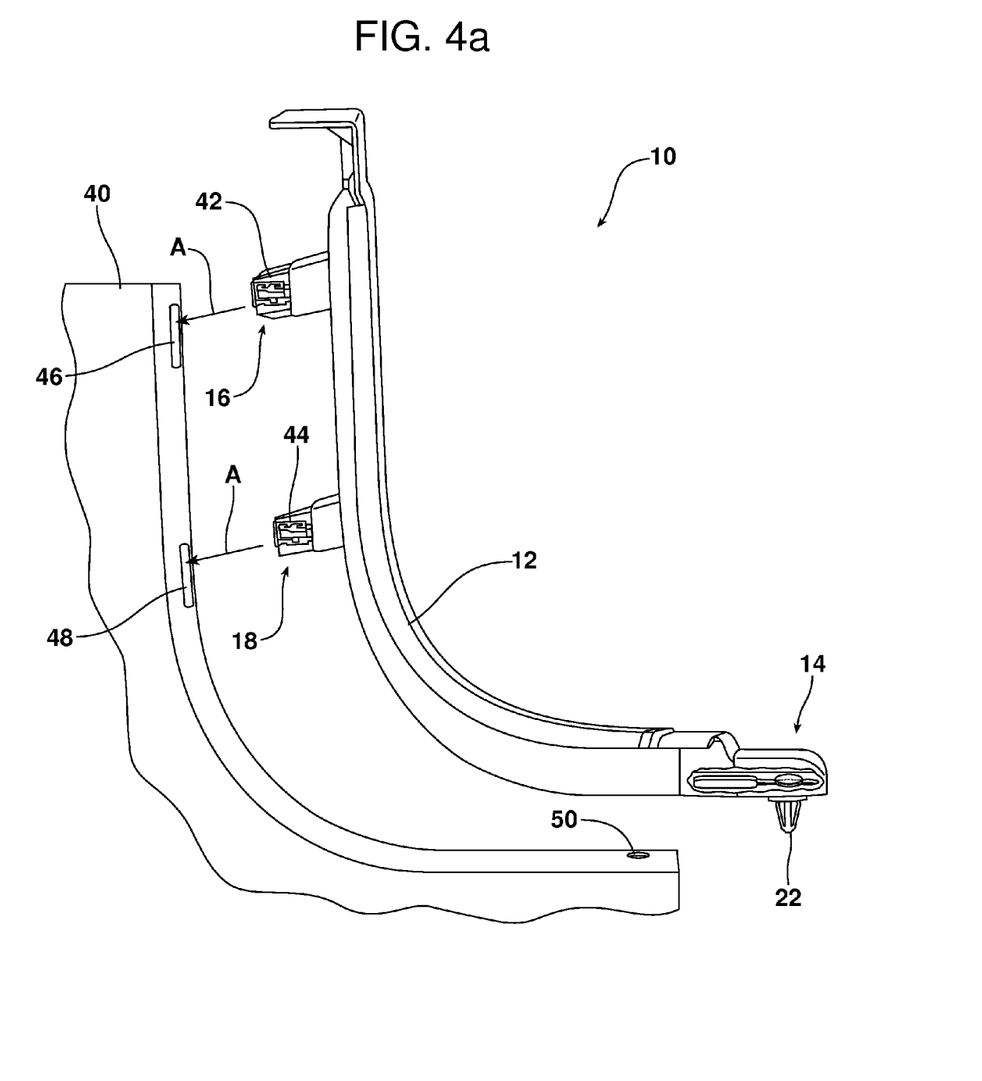
FIGS. 4a-4c illustrate a method of securing the assembly component or cowl trim to a second assembly component.
Figure 4B:
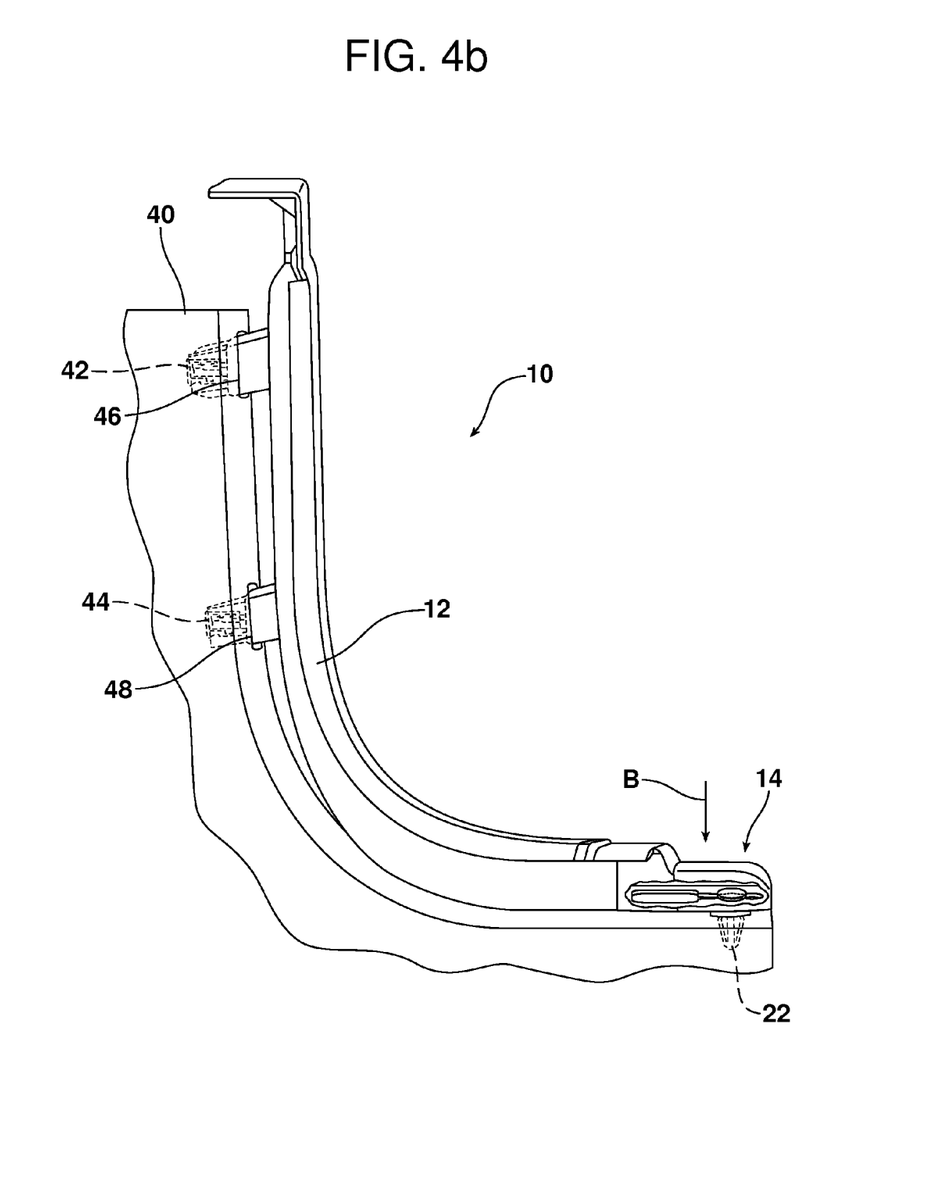
Figure 4C:
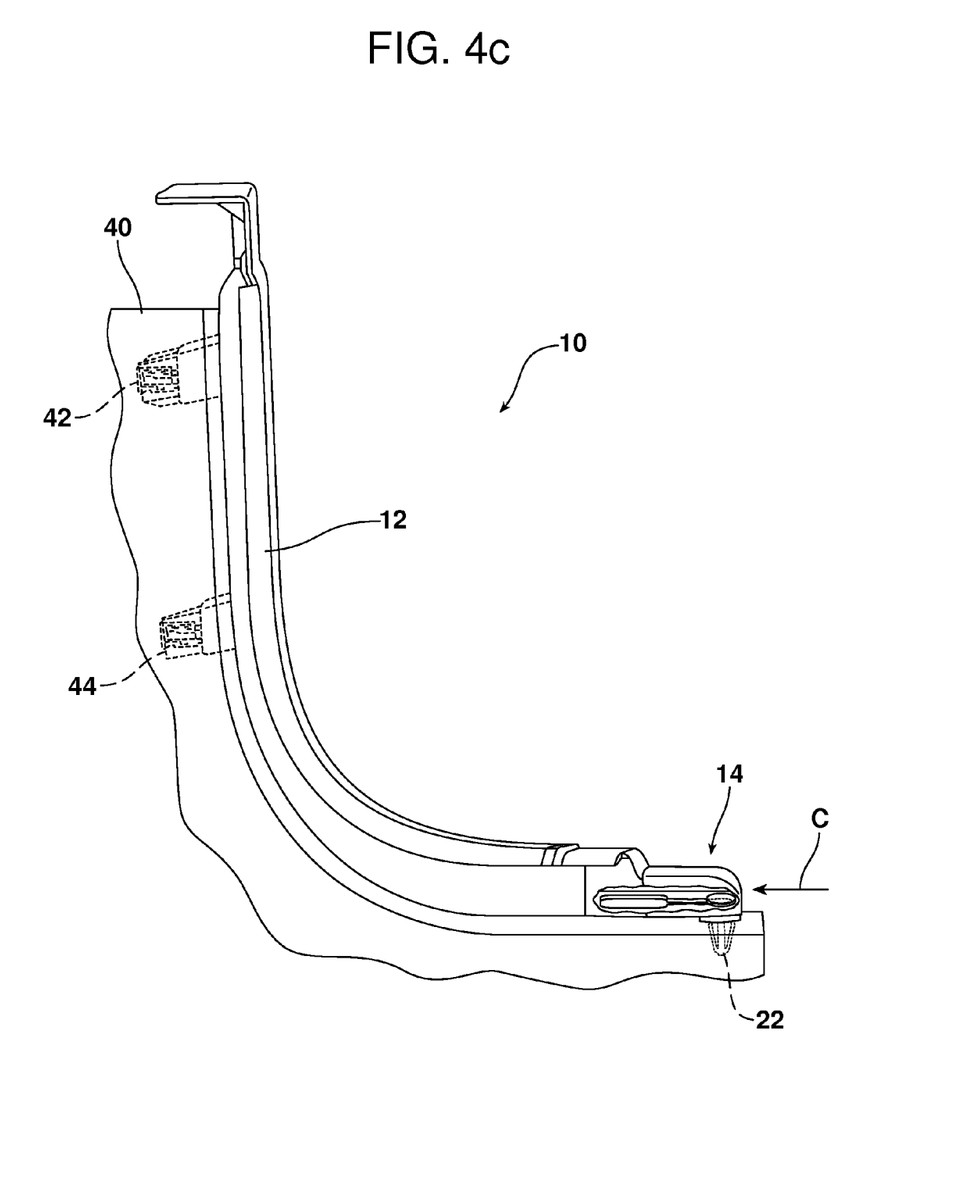

Reference is now made to FIG. 2 which illustrates the multi-step doghouse 14 in detail. As illustrated, the multi-step doghouse 14 includes a single keyhole opening 24 having an entry 26, a preliminary pin retaining position 28 and a final pin retaining position 30 all in open communication with one another. As further illustrated, a first constriction 32 is provided between the entry 26 and the preliminary pin retaining position 28. A second constriction 34 is provided between the preliminary pin retaining position 28 and the final pin retaining position 30. In this particular embodiment, the entry 26, the preliminary pin retaining position 28 and the final pin retaining position 30 are all aligned and the keyhole opening 24 is straight.

Reference is now made to FIGS. 3a, 3b and 4a, 4b and 4c which illustrate a method of assembling the first assembly component 10 to a second assembly component 40. In accordance with this method, the fastening pin 22 is inserted into the preliminary pin retaining position 28 in the keyhole opening 24 of the multi-step doghouse 14 that is carried on the first assembly component 10. This is done by inserting the shaft 25 of the fastening pin 22 into the entry 26, forcing it laterally past the first constriction 32 until that shaft is held in the preliminary pin retaining position 28 by the two adjacent constrictions 32, 34 (note, constrictions define an opening having an overall width that is less than the width of the shaft of the pin). See FIGS. 3a and 4a. Next, the first assembly component 10 is positioned relative to the second assembly component 40 to engage the fasteners 42, 44 at the two fixing points 16, 18 into the receivers 46, 48 on the second assembly component and the fastening pin 22 into engagement with the pin receiving aperture 50 in the second assembly component. This is then followed by the repositioning of the first assembly component 10 with respect to the second assembly component 40 in order to bring the two assembly components into a final, assembled position wherein the fastening pin 22 is simultaneously received and held in the final pin retaining position 30 of the first assembly component 10 and fully engaged in the pin receiving aperture 50 in the second assembly component 40. As this is done, the shaft 25 of the fastening pin 22 is forced past the second constriction 34 into the final pin retaining position 30 adjacent the end wall 52. Here it should be appreciated that the second restriction 34 may be narrower than the first restriction 32 so as to securely seat the fastening pin in the final pin retaining position 30 and substantially eliminate play between the components 10, 40. See FIG. 4c.

As should be appreciated, the multi-step doghouse 14 serves a number of beneficial functions during the assembly process. Specifically, the keyhole opening 24 functions to hold the fastening pin 22 in the assembly component 10 throughout the assembly process. Because the fastening pin 22 is able to move between the preliminary pin receiving position 28 and the final pin receiving position 30 during the final manipulation (note action arrows B in FIG. 4c) of the component part 10 after the two fasteners 42, 44 are secured by manipulation of the part in the direction of action arrows A (see FIG. 4a), less force is required to complete the assembly process and potential part deformation is virtually eliminated. Thus, the installation of the assembly component 10 is simplified and play between the assembled components 10, 40 is substantially eliminated by the receipt of the pin 22 in the final pin retaining position 30 where it is tightly held between the end wall 52 and the second constriction 34 of the keyhole opening 24.

Figure 5:
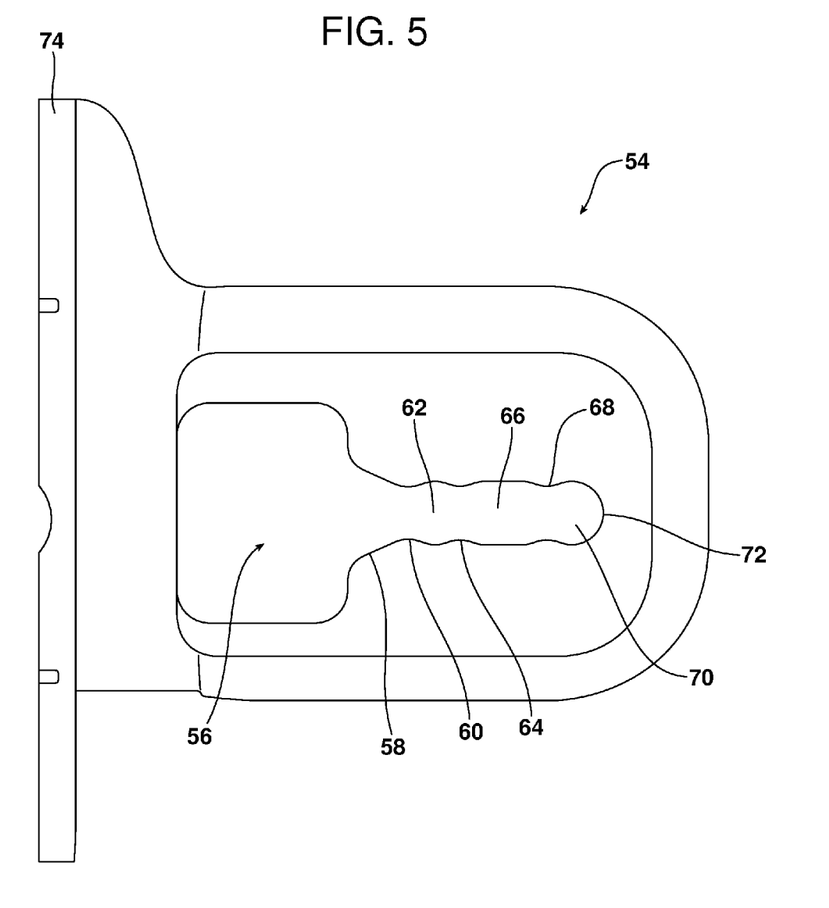
FIG. 5 is a detailed top plan view of an alternative embodiment of a multi-step doghouse that may be incorporated into the assembly component of FIG. 1.

Reference is now made to FIG. 5 illustrating an assembly component 74 including an alternative embodiment of the multi-step doghouse 54. In this embodiment of the multi-step doghouse 54, the keyhole opening 56 includes an entry 58, a first constriction 60, a preliminary pin retaining position 62, a constriction 64 on the opposite side of the preliminary pin retaining position from the first constriction 60, a straight guide path 66, yet another constriction 68 and a final pin retaining position 70 between the constriction 68 and the end wall 72 of the keyhole opening 56.

In this embodiment, the shaft of the fastening pin is inserted through the entry 58 past the first constriction 60 into the preliminary pin retaining position 62. After initial manipulation of the assembly component 74 to, for example, connect other fasteners with a second component (not shown) by movement in a first direction, the assembly component 74 is shifted in a way that allows the fastening pin (not shown) that is held in the keyhole opening 56 to be forced past the constriction 64 and then down the straight guide path 66 past the constriction 68 into the final pin retaining position 70 as the connection for the assembly component 74 is completed.

Figure 6:
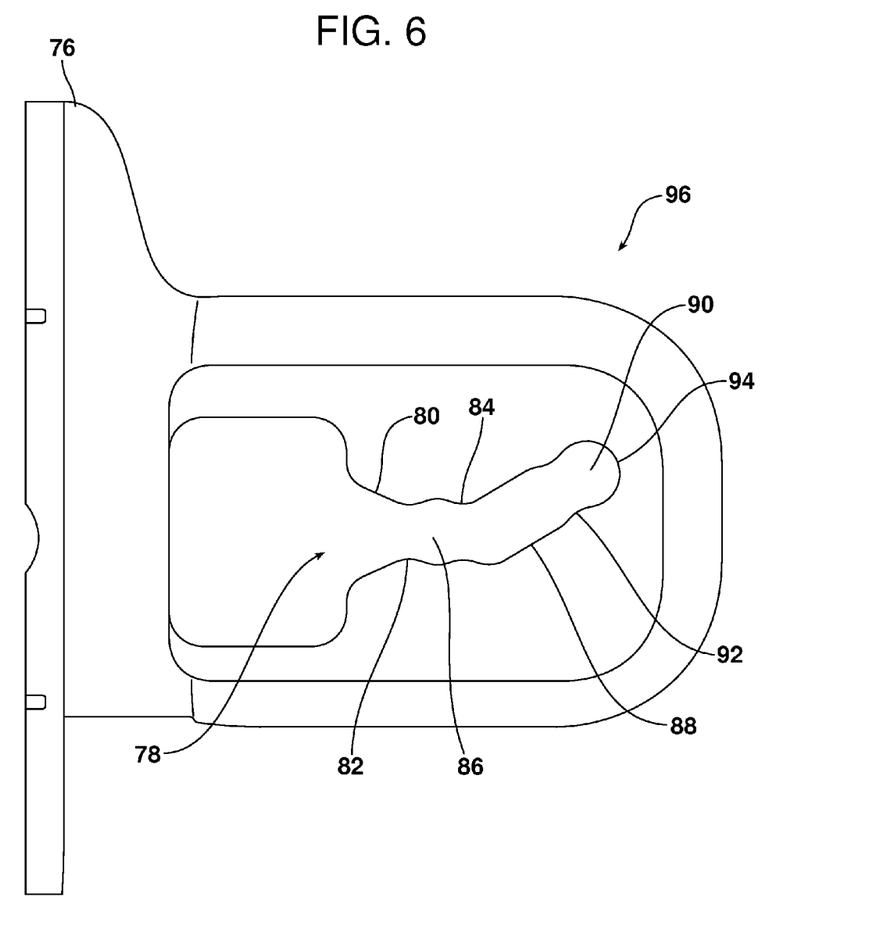
FIG. 6 is a detailed top plan view of yet another possible embodiment of a multi-step doghouse that may be incorporated into an assembly component.

Reference is now made to FIG. 6 illustrating an assembly component 76 incorporating a multi-step doghouse 96 having a keyhole opening 78 having an entry 80, two constrictions 82, 84, defining a preliminary pin retaining position 86 therebetween, an angled guide path 88 and a final pin retaining position 90 between the constriction 92 and the end wall 94. The embodiment of the multi-step doghouse 96 illustrated in FIG. 6 allows manipulation of the assembly component 76 along an angled path as formed by the angled guide path 88 as compared to the straight guide path 66 of the FIG. 5 embodiment.

Figure 7:
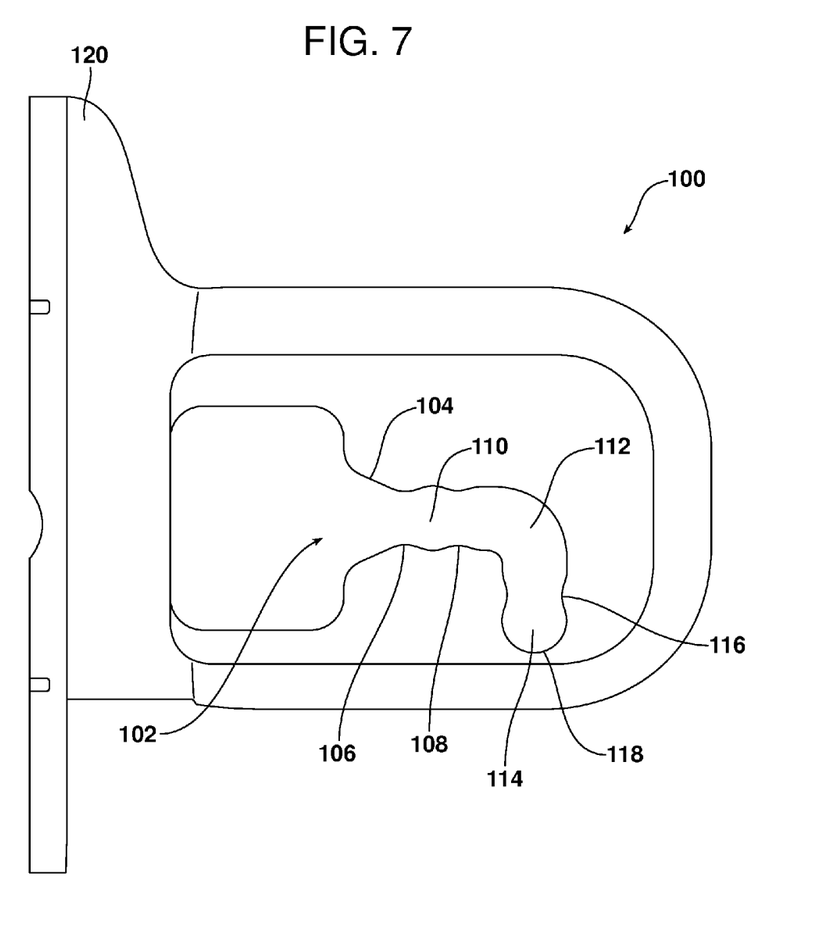
FIG. 7 is a detailed top plan view of yet another possible embodiment of a multi-step doghouse that may be incorporated into an assembly component.

Reference is now made to FIG. 7 illustrating yet another embodiment of the multi-step doghouse 100. In this embodiment, the keyhole opening 102 includes an entry 104, two constrictions 106, 108 defining a preliminary pin retaining position 110 therebetween, a curved guide path 112 and a final pin retaining position 114 defined between the constriction 116 and the end wall 118. While the embodiment of FIG. 5 allows manipulation of the assembly component 74 along a straight guide path 66 and the FIG. 6 embodiment allows manipulation of the assembly component 76 along an angled guide path 88, this embodiment allows manipulation of the assembly component 120 along the curved guide path 112 in order to complete the method of assembling the assembly component 120 to another component.

Figure 8:
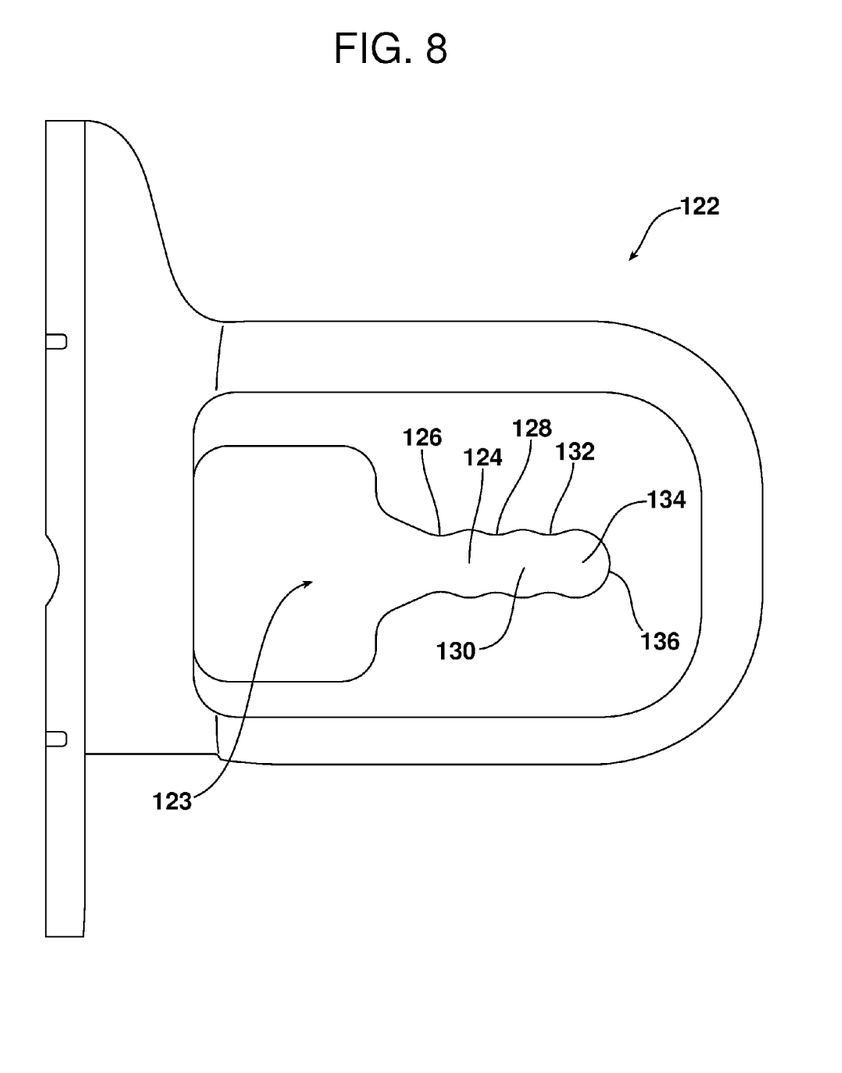
FIG. 8 illustrates yet another embodiment of the assembly component incorporating a multi-step doghouse with two preliminary pin retaining positions and one final pin retaining position.

The foregoing has been presented for purposes of illustration and description. It is not intended to be exhaustive or to limit the embodiments to the precise form disclosed. Obvious modifications and variations are possible in light of the above teachings. For example, as illustrated in FIG. 8, a multi-step doghouse 122 may include a keyhole opening 123 with more than one preliminary pin retaining position: note the first preliminary pin retaining position 124 between the constrictions 126, 128 and the second preliminary pin retaining position 130 between the constrictions 128 and 132 all leading to the final pin retaining position 134 between the constriction 132 and the keyhole opening end wall 136. Multiple preliminary pin retaining positions of this type may be an advantage for certain applications and component assembly processes. All such modifications and variations are within the scope of the appended claims when interpreted in accordance with the breadth to which they are fairly, legally and equitably entitled.

What is claimed:

1. An assembly component, comprising:
    a body; and
    a multi-step doghouse carried on said body said multi-step doghouse including a keyhole opening having a preliminary pin retaining position and a final pin retaining position, said keyhole opening further including an entry, a first constriction between said entry and said preliminary pin retaining position and a second constriction between said preliminary pin retaining position and said final pin retaining position wherein said second constriction is narrower than said first constriction.

2. The component of claim 1, wherein said entry, said preliminary pin retaining position and said final pin retaining position are all aligned and said keyhole opening is straight.

3. The component of claim 1, wherein two of said entry, said preliminary pin retaining position and said final pin retaining position are aligned.

4. The component of claim 3, wherein said keyhole opening is curved.

5. The component of claim 3, wherein said keyhole opening is angled.

6. The component of claim 1, wherein said keyhole opening includes a third constriction between said preliminary pin retaining position and said second constriction.

7. The component of claim 6, wherein said keyhole opening includes a pin guide path between said second constriction and said third constriction.

8. The component of claim 7, wherein said pin guide path is straight.

9. The component of claim 7, wherein said pin guide path is curved.

10. The component of claim 9, wherein said pin guide path includes at least one angle.

11. The component of claim 1, wherein said keyhole opening includes a second preliminary pin retaining position between said first preliminary pin retaining position and said final pin retaining position.

12. A method for assembling a first assembly component to a second assembly component, comprising:
    inserting a fastening pin into a preliminary pin retaining position in a keyhole opening of a multi-step doghouse carried on said first assembly component;
    positioning said first assembly component relative to said second assembly component to bring said fastening pin into engagement with a pin receiving aperture in said second assembly component;
    repositioning said first assembly component relative to said second assembly component to bring said first assembly component and said second assembly component into a final assembled position wherein said fastening pin is (a) received and held in a final pin retaining position in said keyhole opening carried on said first assembly component and (b) fully engaged in said pin receiving aperture in said second assembly component; and
    securing at least one fastener between said first assembly component and said second assembly component prior to said repositioning step.

13. The method of claim 12, further including moving said fastening pin through said keyhole opening between said preliminary pin retaining position and said final pin retaining position when repositioning said first assembly component relative to said second assembly component.

14. The method of claim 13, further including moving said fastening pin along a straight path between said preliminary pin retaining position and said final pin retaining position.

15. The method of claim 13, further including moving said fastening pin along a curved path between said preliminary pin retaining position and said final pin retaining position.

16. The method of claim 13, further including moving said fastening pin along an angled path between said preliminary pin retaining position and said final pin retaining position.

* * * * *